United States Patent [19]
Watt

[11] 3,761,147
[45] Sept. 25, 1973

[54] GENERAL UTILITY HYDROSTATIC SPINDLE

[76] Inventor: Gordon James Watt, Apt. 106, 245 Unquowa Rd., Fairfield, Conn. 06430

[22] Filed: Jan. 31, 1972

[21] Appl. No.: 221,865

[52] U.S. Cl. .................................................. 308/9
[51] Int. Cl. ............................................ F16c 17/16
[58] Field of Search ............................... 308/9, 122

[56] References Cited
UNITED STATES PATENTS
2,919,960  1/1960  Whitney.......................... 308/122
3,112,140  11/1963  Adams............................ 308/122

OTHER PUBLICATIONS
Product Engineering, April 1956, pages 156 and 157 relied upon.

Primary Examiner—Charles J. Myhre
Assistant Examiner—Frank Susko
Attorney—H. L. Boettcher and S. Goldsmith et al.

[57] ABSTRACT

A spherical and plane hydrostatic bearing of the outlet restrictor types rigidly combined in a compact spindle structure comprising a central housing with finished surfaces and bores, a shaft with thrust plate and truncated hemispherical bearing surface at opposite ends, and means for bringing fluid under pressure to the inner peripheries of the matched bearing surfaces to flow radially or longitudinally outward to the outer peripheries where clearance is slightly restricted. The bearings are self-adjusting for spacing and alignment, non-interacting with regard to individual degrees of freedom, and together define the spindle axis as the normal to the plane of the thrust bearing through the center of the spherical bearing.

8 Claims, 3 Drawing Figures

PATENTED SEP 25 1973

3,761,147 ial spinThree,761,147

GENERAL UTILITY HYDROSTATIC SPINDLE

BACKGROUND OF THE INVENTION

Hydrostatic bearings have been used for spindle applications in various combination, usually in matched pairs. There are many examples of opposed thrust bearings combined with pairs of journal bearings, pairs of spherical bearings of the inlet restrictor type, single thrust bearings preloaded by weight or pressure and combined with journal bearings, and journal bearings restricted axially by ball and anvil. These bearing combinations have a variety of drawbacks primarily associated with interaction between bearing pairs, demanding highly precise dimensions and alignment in manufacture. It will be shown in the following disclosure how these deficiencies may be avoided.

Various types of outlet restrictor bearings are described in the art. These include bearings where the clearance in the bearing area gradually decreases in the direction of fluid flow; bearings with constant clearance in the bearing area and a small step at the outlet to decrease the clearance there; bearings with constant clearance throughout except for grooves cut in the surface of the main bearing area to reduce the flow resistance there; and bearings with a membrane surface in the main bearing area which yields with in-flow to increase the clearance there when the bearing is pressurized. Current patents covering the principles of these bearings are primarily related to journal bearings although the spherical and plane configurations of Flexible Membrane Bearing are claimed in co-pending U.S. Pat. application No. 159,608 filed July 6, 1971.

The outlet restrictor bearing is controlled almost wholly by the clearance between the bearing surfaces at the outlet edge. It is much less sensitive to any changes in clearance in the main bearing area because of the greater clearance there and the inverse third power dependence of pressure gradients on clearance for a given fluid flow. This is in contrast to inlet restrictor bearings such as orifice bearings or porous bearings where control is effected by clearance changes over the whole bearing area. Therefore manufacturing tolerances for outlet restrictor bearings are less stringent in that great care needs to be taken only around the outlet edge. When the outlet edge is located outboard from the bearing center, maximum restoring moment is provided by outlet restrictor thrust bearings.

General utility hydrostatic spindles have various applications for precision machining and measurement. Included are boring, turning, facing, grinding, sphere generation, roundness measurements, torque measurements, and optical scanning. It is the purpose of this invention to provide an improved spindle which is adaptable to many uses, self aligning and self adjusting for manufacturing tolerances, serviceable for cleaning and repair, and highly precise and stiff.

SUMMARY OF THE INVENTION

The invention disclosed here is an improved bearing configuration and structure for a general utility hydrostatic spindle. The spindle shaft comprises an hemispherical journal and thrust plate of similar diameter symmetrically disposed to the spindle axis with the convex hemispherical surface facing the plane of the plate. Together they form a rigid hollow shaft resembling a wine glass with a short stem. Mating surfaces on a compact housing are spaced to provide a small but finite clearance when the shaft is assembled with the housing. Said clearance is maintained by fluid under pressure when the spindle is being used. Forces of the load on the shaft and pressure of the lubricating fluid on the bearing surfaces produce displacements and deformations in the structure which account for bearing action.

In the preferred configuration, bearing surfaces of the shaft are formed of flexible membranes supported at the edges. When bearing surfaces are formed on the body of the shaft they must be contoured so as to provide a decreasing clearance with the mating surfaces on the housing, in the direction of fluid flow between the mating surfaces. Various forms of outlet restrictor hydrostatic bearings are suited to this improved spindle configuration. Thus choice of the flexible membrane bearing to illustrate the principles does not obviate the use of rigid surfaces with converging tapers, steps, or grooves as alternate bearings within the scope of this invention. The principle of import is the sensitive control of bearing pressures by changes of clearance at the outlet edge of the bearing.

Spindle geometry is defined by the point which is the center of rotation of the spherical bearing and the plane which is the mating surface between the thrust plate and the housing. Pressure between the spherical surfaces holds the thrust plate against the housing, thus maintaining the shortest distance between the point and the plane, the normal to the plane. This is the line which defines the axis of rotation of the spindle. The sphere is guided by its outlet perimeter which is a great circle parallel to the plane of the thrust bearing. Within a broad tolerance, the sphere has no preferred axis and so will adjust to the one determined by the plane of the thrust bearing. Similarly the thrust bearing has no specific center and so will adjust to the center of rotation of the sphere. Therefore the spindle is self aligning when assembled and in operation. The only thing which will change its axis of rotation is when the thrust bearing tilts or the sphere runs eccentrically with its mating surface.

The thrust bearing is controlled by the restricted clearance at its outer periphery. It therefore produces a maximum righting moment to forces which tend to cause it to tilt. The spherical bearing is relatively insensitive to axial motions because its sensing surface is parallel to the axis. Similarly the thrust bearing is not sensitive to radial motions because its sensing surface is in the radial plane. So long as the bearings are stiff and the structure is rigid, the general utility hydrostatic spindle is a great improvement over other spindles in that it is self aligning, the bearings are non-interacting, and the greatest manufacturing accuracy is required in narrow bands at the outlet edges.

Fluid at line pressure is fed through the housing into a recessed area adjacent to the shaft between the top of the hemisphere and the thrust plate, approximately at 70° latitude on the hemisphere. An annular groove is cut into the housing around the hemisphere at 70°, and a clearance of approximately one thousandth of an inch is left between the shaft and housing to a region of the plate corresponding to the diameter of the 70° latitude circle. Normal operating clearance of the bearings at the outlet edges is approximately one-third of a thousandth of an inch. Thus there is little pressure drop in the shaft clearance area yet sufficient clearance to accomodate self alignment of the shaft in the housing.

The thrust bearing operates with a relatively constant preload produced by the axial component of pressure on the surface of the spherical bearing. This preload is not affected appreciably by axial displacement of the shaft because of the trivial stiffness of the spherical bearing in the axial direction. The bias force is about five times the differential load capacity of the thrust bearing. Further, the bias force and the stiffness of the thrust bearing change together with line pressure in such a manner to maintain a constant axial shaft position if the line pressure should vary.

The improvements set forth in this disclosure are best understood in relation to other spindle arrangements such as those set forth in U.S. Pat. No. 3,472,565 where pairs of bearings are used in tandem or in opposition. Each additional bearing costs more money to operate because it consumes more fluid. Bearings in pairs cost more to build because of the alignment and adjustment involved in the manufacture. When two bearings control the same degree of freedom, performance is impaired by the interaction between them if any manufacturing tolerances have affected the symmetry. Consider these factors now in respect to a detailed description of the drawings.

DETAILED DESCRIPTION OF THE DRAWINGS

Figure 1:
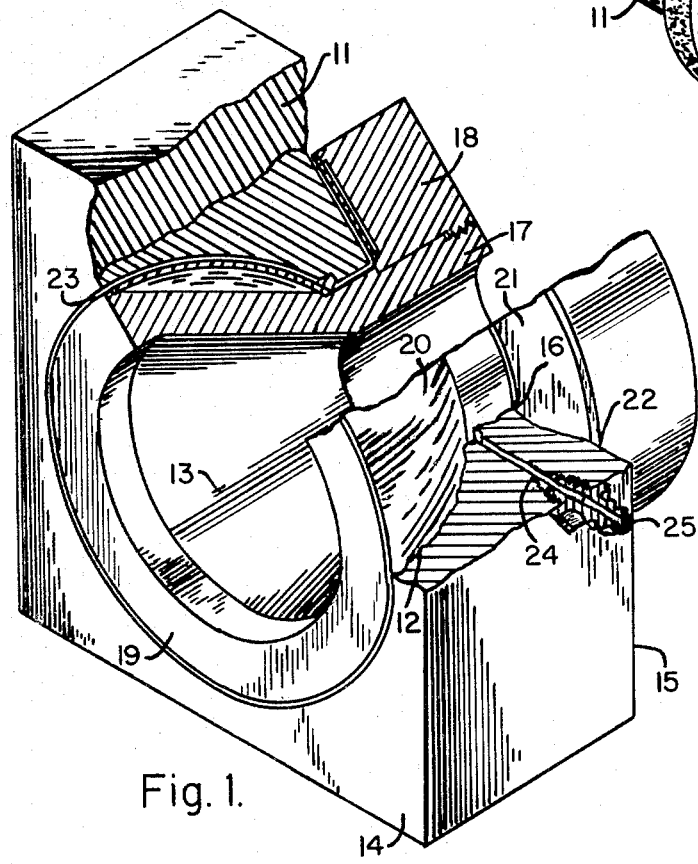
FIG. 1 is a partially sectioned perspective view of the spindle configuration, showing the preferred embodiment using Flexible Membrane Bearings. All of the important self aligning features of the invention may be studied with respect to this drawing.

Referring now to the drawings and particularly to FIG. 1 where a partially sectioned side view of the General Utility Hydrostatic Spindle shows in perspective important details of the preferred embodiment, the self aligning features of the bearing can be ascertained. The housing 11 has a concave spherical surface 12 with center 13 in the plane of one face 14 of the housing. The opposite housing face 15 is a carefully prepared flat which is approximately parallel to the face 14. The spindle axis is defined by the line through the center 13 of the concave spherical section and normal to the plane surface 15.

A hole 16 is bored through the housing, approximately concentric with the spindle axis and intersecting the spherical surface in the region of the 65° latitude circle. The housing is thick enough to leave elements of the cylindrical surface between the spherical surface 12 and the plane surface 15 of length about twenty percent of the housing thickness. It is to be noted that in the preparation of the housing there are no crucial tolerances for distance or alignment between surfaces. In fact the spherical center does not need to lie exactly in the housing face 14 as depicted by the short line at 13 in FIG. 1.

The spindle shaft 17 is shaped like a funnel, fitting the housing radially with something more than a thousandth of an inch clearance at both faces and along the elements of the bored hole. The thrust plate 18 attaches firmly to the shaft with its bearing face in a plane normal to the axis and against a shoulder of the shaft which just extends beyond the housing face 15. The axial distance between said shoulder and the face 19 of the shaft at the flared end is just slightly less than the housing width between faces 14 and 15. The face 19 lies just below the housing face 14 when the thrust plate lies against the housing face 15.

In the preferred embodiment, the bearing surfaces on the shaft are flexible membrane members supported by the shaft at their peripheries after the manner of the referenced Flexible Membrane Bearing. The spherical bearing membrane 20 is a truncated hemispherical shell which mounts outside the flared section of the shaft, and its outside surface closely matches the concave spherical surface 12 with a clearance around the equatorial section of two- or three-tenths of a thousandth of an inch. The thrust membrane 21 is a thin flat washer shaped disc whose outside face is formed to be very flat to match the plane surface 15.

Other bearing surfaces of a more rigid nature may be used as long as they are contoured to form outlet restrictor hydrostatic bearings. For instance a raised step may be left at the outlet bearing surfaces in the region 22 of the thrust plate and 23 of the spherical bearing to decrease the clearance there as compared to the main bearing areas, identified by surfaces 20 and 21 in the preferred embodiment. Clearance of more rigid bearings may be made to converge along the flow paths by tapering or by cutting shallow grooves in the surfaces. In any of these bearings the important matter is high sensitivity of pressure in the bearing areas to variations in clearance at the outlet edges.

The bearings are activated by bringing fluid under pressure through appropriate channels 24 and fittings 25 to the clearance region 16 between the shaft and the housing. This clearance is roughly five times the normal clearance between bearing surfaces when the spindle is operating. Hydraulic resistance in the shaft clearance area 16 is so small compared to the resistance along the main bearing areas and at the outlets that there is effectively no loss in line pressure up to the inlet regions. The spherical bearing surface in the region of the inlet area is slightly relieved to force the thrust plate against the housing face and hold it there during operation.

The crux of the invention disclosed here resides in the interactions between the bearing geometry as produced by the pressures and forces on the shaft assembly. Stiffness of the mechanical structures relative to the bearing stiffness is an important consideration as is the relative clearance between the various surfaces. It is to be noted that axial motion of the shaft does not change the radial outlet clearance 23 and radial motion of the shaft does not change the thrust outlet clearance 22.

Forces developed on the bearing surfaces as a result of fluid pressure react normally to the surfaces. Therefore the resultant force developed by the spherical bearing acts through the center 13. This bearing can produce no moments about its center. Similarly the net force developed by the thrust bearing must be along the spindle axis and through the center 13. The thrust bearing can develop a moment about the spherical axis if the thrust plate is tilted relative to the plane face 15 of the housing. The spherical bearing has no appreciable axial stiffness and the thrust bearing has no radial stiffness. In the case of the rigid structure comprising the shaft and thrust plate, said bearings act together to resist any combination of forces and moments on the shaft except for moments about the spindle axis.

One way to reduce the moment produced by side loads is to apply said loads as close as possible to the plane 19 of the spherical center 13. A face plate, a chucking device, or a collet may be mounted on the shaft at the flared end, using the face 19 and the open center portion of the shaft for alignment and centering. A practical means for mounting such fixtures is to draw them against the face 19 by a shaft which extends through to the thrust end and centers on the bored surface of the spindle shaft 17.

Figure 2:
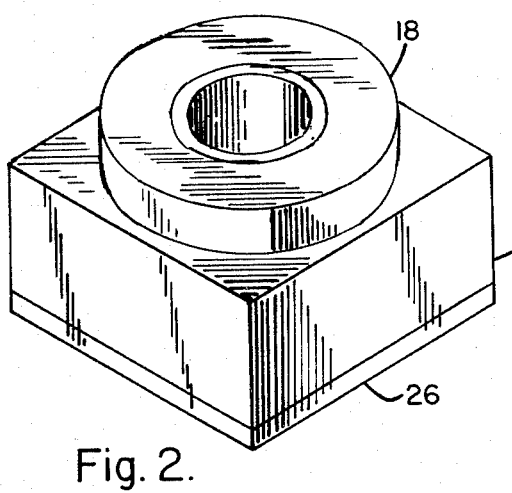
FIG. 2 shows an important application for the spindle as it might be used for a rotary table with the axial load supported at the thrust plate.
Figure 3:
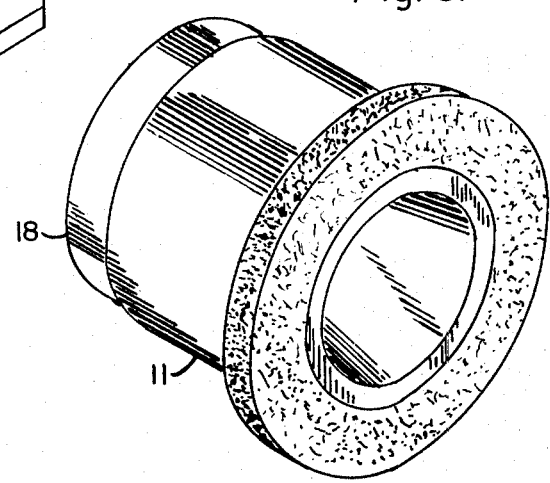
FIG. 3 indicates a housing configuration which would be useful for a spindle in applications for cylindrical or surface grinders. Here the grinding wheel is shown supported at the radial face.

The spindle may be used as a rotary table in the manner shown in FIG. 2. Here a back plate 26 is shown mounted on the spindle face 14 for protection in handling. Another practical configuration for the spindle is shown in FIG. 3 where a grinding wheel is mounted at the face 19 in the manner described for auxiliary fixtures. The housing 11 is shown finished in cylindrical form as a preferred shape for a grinding spindle.

I claim as my invention:

1. In an outlet restrictor hydrostatic bearing spindle having a spindle shaft rotatably supported in a spindle housing by means of bearing surfaces of said shaft which cooperate with respective complementary bearing surfaces of said housing to provide the spindle with radial and axial stiffness when pressurized lubricating fluid is caused to flow out of the spindle through respective clearances between the cooperating bearing surfaces, the improvement wherein:
   a. the bearing surfaces of said housing comprise a concave truncated hemispherical surface and a plane surface so oriented with respect to one another that a line from the spherical center of said hemispherical surface perpendicular to said plane surface coincides with the spindle axis;
   b. a bore of said housing is centered on the spindle axis, the bore having an inner end merging with and terminating at the truncated end of the hemispherical surface of said housing and having an outer end terminating at the plane surface of said housing, the length of the bore being a fraction of the distance between the equatorial plane of said hemispherical surface and said plane surface; and
   c. the housing is provided with inlet passageway means for conveying pressurized lubricating fluid to a clearance region between said shaft and said bore, said clearance region communicating with the respective clearances between the cooperating hemispherical bearing surfaces and the cooperating plane bearing surfaces to permit said flow of the fluid out of said spindle in axial and radial directions, respectively, with respect to said spindle axis.

2. The combination according to claim 1, wherein:
   a. a first restricted outlet for the pressurized lubricating fluid is provided by the clearance between the respective equatorial regions of the hemispherical bearing surface of said housing and the cooperating complementary hemispherical bearing surface of said shaft;
   b. a second restricted outlet for said fluid is provided by the clearance between the plane bearing surface of said housing and a narrow annulus region of the cooperating complementary plane bearing surface of said shaft adjacent an outer edge thereof.

3. The combination according to claim 1, wherein said spindle shaft includes an imperforate flexible membrane formed as a truncated hemispherical shell, one side of said shell constituting the hemispherical bearing surface of said shaft, the other side of said shell being connected at its equatorial and truncated ends in supported relation to said shaft, said shaft having a body portion underlying said shell, said body portion having a truncated conical configuration providing a space to accommodate inward deformations of said shell caused by the pressure of lubricating fluid flowing out of said spindle through the clearance between said one side of the shell and the cooperating complementary hemispherical bearing surface of the housing.

4. The combination according to claim 1, wherein said spindle shaft includes an imperforate flexible membrane formed as a thin flat washer, one side of said washer constituting the plane bearing surface of said shaft, the other side of said washer being connected at its inner and outer peripheries in supported relation to raised annular lands of said shaft which are coaxial with said spindle axis and which provide a space to accommodate inward deformations of said washer caused by the pressure of lubricating fluid flowing out of said spindle through the clearance between said one side of the washer and the cooperating complementary plane bearing surface of the housing.

5. The combination according to claim 1, wherein the plane and hemispherical bearing surfaces of said shaft are defined by flexible membranes supported at their respective inlet and outlet edges in such a manner that respective spaces are left underneath the membranes for accommodating deformations thereof induced by lubricating fluid pressure in the respective clearances between the bearing surfaces defined by the membranes and the respective cooperating bearing surfaces of said housing.

6. An outlet restrictor hydrostatic bearing assembly, comprising a bearing block having a truncated hemispherical cavity formed in one end thereof coaxially with a cylindrical bore formed in an opposite end thereof, the inner end of said bore merging with and terminating at the truncated end of said cavity inside of said block, the outer end of said bore terminating at a planar external bearing surface of the block perpendicular to the common axis of said bore and cavity, a rotatable spindle shaft extending through said block and having respective bearing surfaces complementary to and clearing the hemispherical surface of said cavity and said planar external bearing surface of said block, said shaft and bore having clearance therebetween connecting with inlet ends of the respective bearing surface clearances, and passageway means in said block adapted to be connected to an external source of pressurized lubricating fluid for conveying said fluid to said clearance between said shaft and bore for flow through said bearing surface clearances from said inlet ends thereof to outlet restrictor ends thereof.

7. The assembly according to claim 6, wherein the bearing surface of said shaft which is complementary to the planar external bearing surface of said block is on a hollow cylindrical thrust plate surrounding and removably attached to a cylindrical portion of said shaft axially extending outside of said block from said bore.

8. The assembly according to claim 6, wherein the respective bearing surfaces of said shaft complementary to the hemispherical surface of said cavity and to said planar external bearing surface of said block are defined by flexible membranes which are supported at said inlet and outlet ends and which are free to deform intermediate these ends in response to fluid pressure changes in said bearing surface clearances.

* * * * *